United States Patent
Watts et al.

(10) Patent No.: US 12,432,640 B2
(45) Date of Patent: Sep. 30, 2025

(54) CONDITIONAL TRIGGER FOR FLIGHT PATH UPDATE INDICATION

(71) Applicant: InterDigital Patent Holdings, Inc., Wilmington, DE (US)

(72) Inventors: Dylan Watts, Montreal (CA); Oumer Teyeb, Montreal (CA); Paul Marinier, Brossard (CA); Brian Martin, Farnham (GB); Martino M. Freda, Laval (CA); Erdem Bala, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/755,756

(22) Filed: Jun. 27, 2024

(65) Prior Publication Data

US 2024/0349160 A1 Oct. 17, 2024

Related U.S. Application Data

(63) Continuation of application No. PCT/US2024/015495, filed on Feb. 13, 2024.
(Continued)

(51) Int. Cl.
H04W 40/02 (2009.01)
H04W 40/20 (2009.01)
H04W 76/10 (2018.01)

(52) U.S. Cl.
CPC ......... *H04W 40/026* (2013.01); *H04W 40/20* (2013.01); *H04W 76/10* (2018.02)

(58) Field of Classification Search
CPC .... H04W 40/026; H04W 76/10; H04W 40/20
(Continued)

(56) References Cited

U.S. PATENT DOCUMENTS

| 2015/0323930 A1 | 11/2015 | Downey et al. |
| 2020/0372808 A1 | 11/2020 | Carraway et al. |

(Continued)

FOREIGN PATENT DOCUMENTS

| EP | 3809229 A1 | 4/2021 |
| JP | 2019163992 A | 9/2019 |

(Continued)

OTHER PUBLICATIONS

3rd Generation Partnership Project, R2-2212340, "Flight Path Reporting for UAV", InterDigital, 3GPP RAN WG2 Meeting #120, Toulouse, France, Nov. 14-18, 2022, pp. 1-3.
(Continued)

*Primary Examiner* — Gbemileke J Onamuti
(74) *Attorney, Agent, or Firm* — Condo Roccia Koptiw LLP

(57) ABSTRACT

Systems, methods, devices, and instrumentalities are described herein related to conditional triggers for flight path update indications. A wireless transmit/receive unit (WTRU) may receive configuration information. The configuration information may indicate a trigger condition (e.g., threshold) associated with enabling transmission of a flight path update indication. The WTRU may determine that the threshold associated with enabling transmission of the flight path update indication is satisfied. Based on the threshold being satisfied, the flight path update indication may be transmitted. The WTRU may receive a request to transmit the updated flight path information and transmit the updated flight path information.

17 Claims, 12 Drawing Sheets

Related U.S. Application Data

(60) Provisional application No. 63/445,617, filed on Feb. 14, 2023.

(58) Field of Classification Search
USPC .......................................................... 370/329
See application file for complete search history.

(56) References Cited

U.S. PATENT DOCUMENTS

| | | |
|---|---|---|
| 2020/0413406 A1 | 12/2020 | Tang |
| 2021/0201685 A1* | 7/2021 | Han .................... G08G 5/34 |
| 2021/0227534 A1 | 7/2021 | Määttänen et al. |
| 2022/0404484 A1 | 12/2022 | Saha et al. |
| 2024/0096223 A1 | 3/2024 | Lee et al. |
| 2024/0121693 A1* | 4/2024 | Saha .................. G08G 5/0008 |
| 2024/0147337 A1* | 5/2024 | Huang ................ H04W 36/322 |

FOREIGN PATENT DOCUMENTS

| | | | |
|---|---|---|---|
| WO | 2019234592 A1 | 12/2019 | |
| WO | 2024128687 A1 | 6/2024 | |

OTHER PUBLICATIONS

3$^{rd}$ Generation Partnership Project, R2-2212800, "Discussion on Flight Path Reporting for NR UAV", China Telecom, 3GPP TSG-RAN WG2 Meeting #120, Toulouse, France, Nov. 14-18, 2022, 4 pages.

TS 38.300 V17.2.0, "3rd Generation Partnership Project (3GPP)", Technical Specification Group Radio Access Network, NR, NR and NG—RAN Overall Description, Stage 2 (Release 17), Sep. 2022, 210 pages.

TS 38.321 V17.2.0, "3rd Generation Partnership Project (3GPP)", Technical Specification Group Radio Access Network, NR, Medium Access Control (MAC) protocol specification (Release 17), Sep. 2022, 246 pages.

TS 38.331 V17.2.0, "3rd Generation Partnership Project (3GPP)", Technical Specification Group Radio Access Network, NR, Radio Resource Control (RRC) protocol specification (Release 17), Sep. 2022, 1298 pages.

* cited by examiner

CONDITIONAL TRIGGER FOR FLIGHT PATH UPDATE INDICATION

CROSS-REFERENCE TO RELATED APPLICATIONS

This application filed under 35 U.S.C. § 111 is a continuation of and claims the benefit, under 35 U.S.C. § 365, of Patent Cooperation Treaty Application No. PCT/US2024/015495, filed Feb. 13, 2024, which claims the benefit of Provisional U.S. Patent Application No. 63/445,617, filed Feb. 14, 2023, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, devices, and instrumentalities are described herein related to conditional triggers for flight path update indications.

A wireless transmit/receive unit (WTRU) may receive configuration information. The configuration information may indicate a trigger condition (e.g., threshold) associated with enabling transmission of a flight path update indication. The WTRU may determine that the threshold associated with enabling transmission of the flight path update indication is satisfied.

In examples, the threshold may be a distance threshold. The distance threshold associated with enabling transmission of the flight path update indication may be satisfied based on a distance between a position of the WTRU and a previously provided flight path location exceeding the distance threshold. In examples, the threshold may be a time-based threshold. The time-based threshold associated with enabling transmission of the flight path update may be satisfied based on a time of arrival at a waypoint location exceeding a previously reported time of arrival by the time-based threshold. In examples, the threshold may be a waypoint threshold. The waypoint threshold associated with enabling transmission of the flight path indication may be satisfied based on a number of invalidated waypoint(s) exceeding the waypoint threshold.

Based on the threshold being satisfied, the flight path update indication may be transmitted. In examples, the flight path update indication may be transmitted via a UE assistance information (e.g., WTRU assistance information) message or via radio resource control (RRC) signaling. The WTRU may receive a request to transmit the updated flight path information and transmit the updated flight path information.

DETAILED DESCRIPTION

Figure 1A:
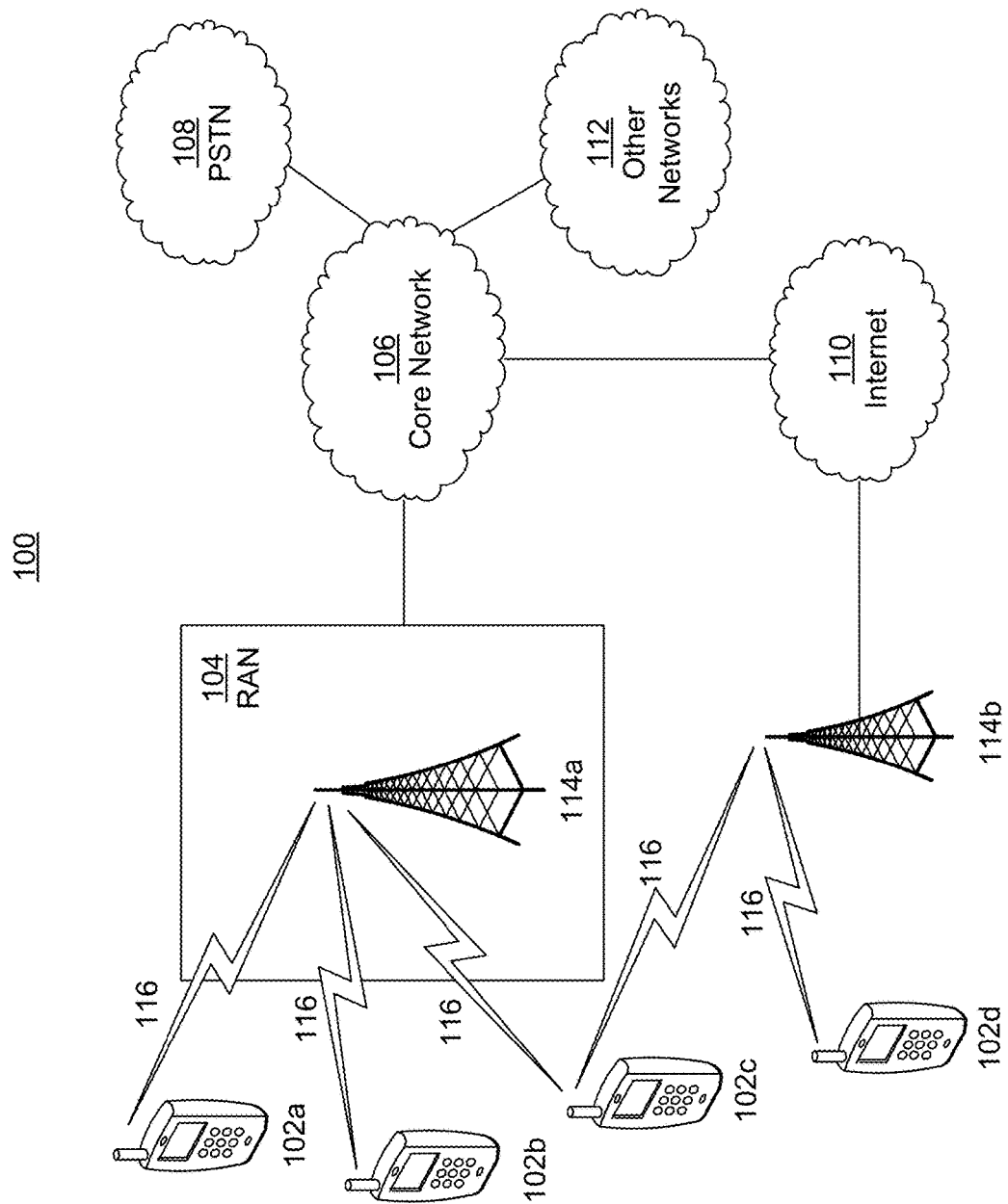
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
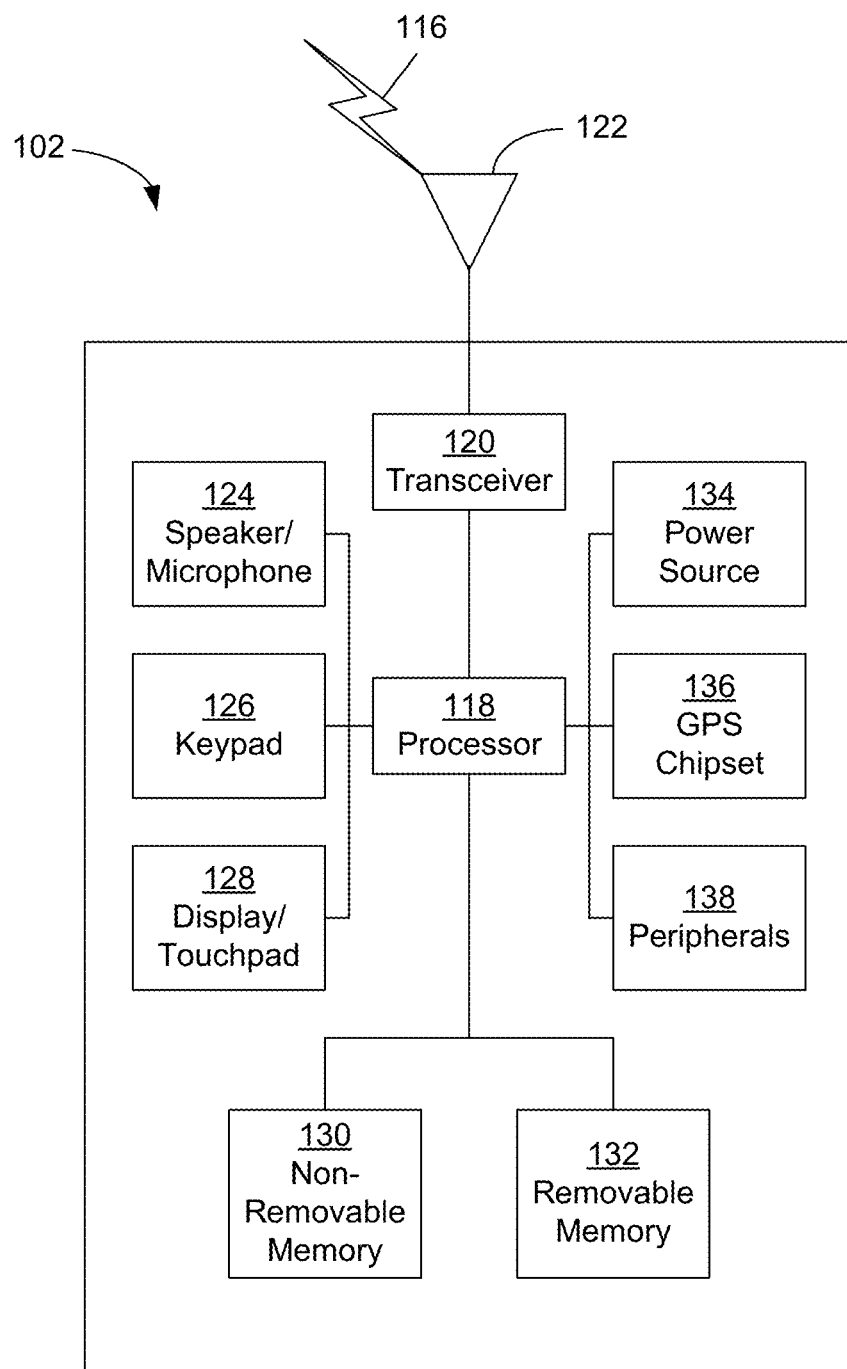
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the uplink (UL) (e.g., for transmission) or the downlink (e.g., for reception)).

Figure 1C:
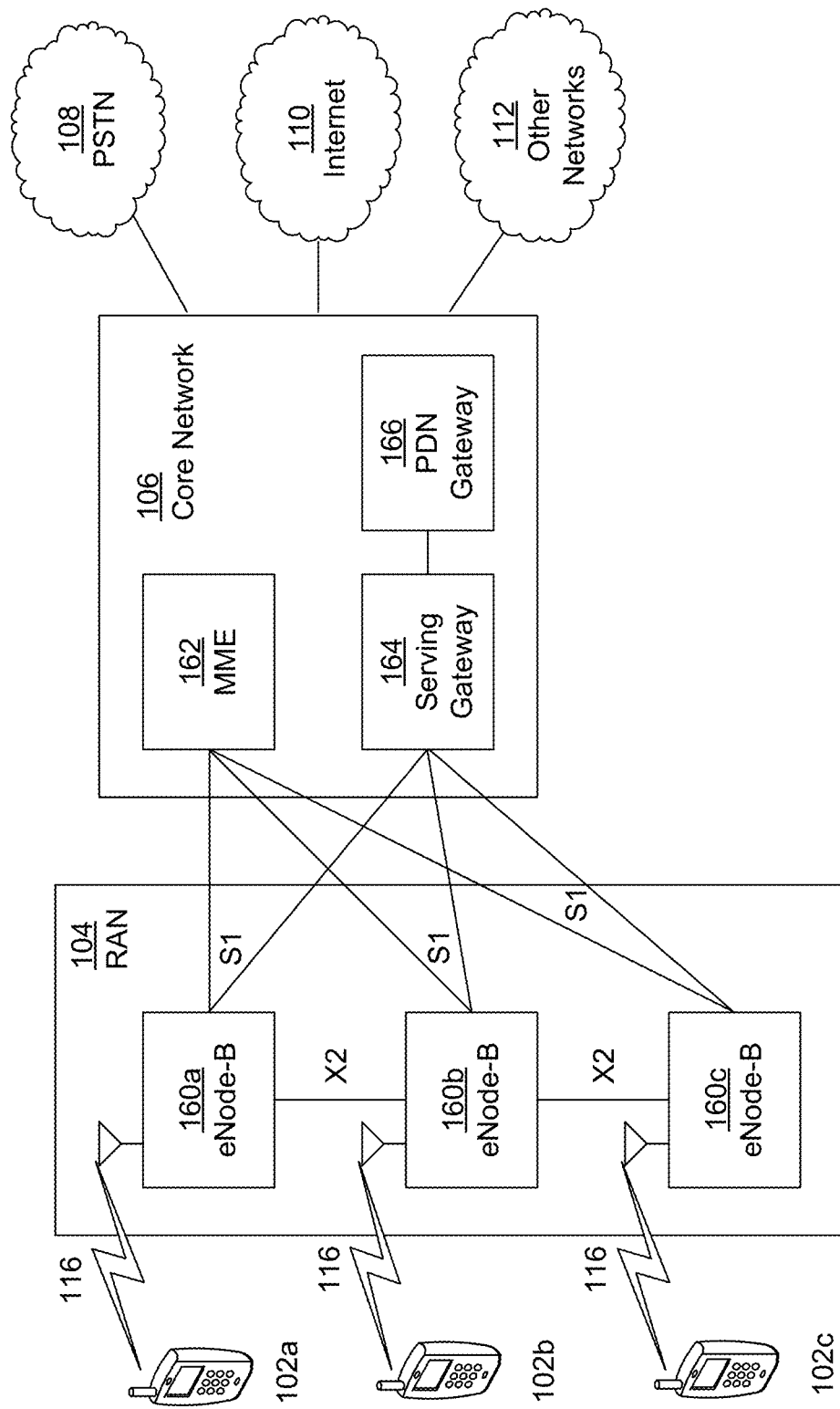
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
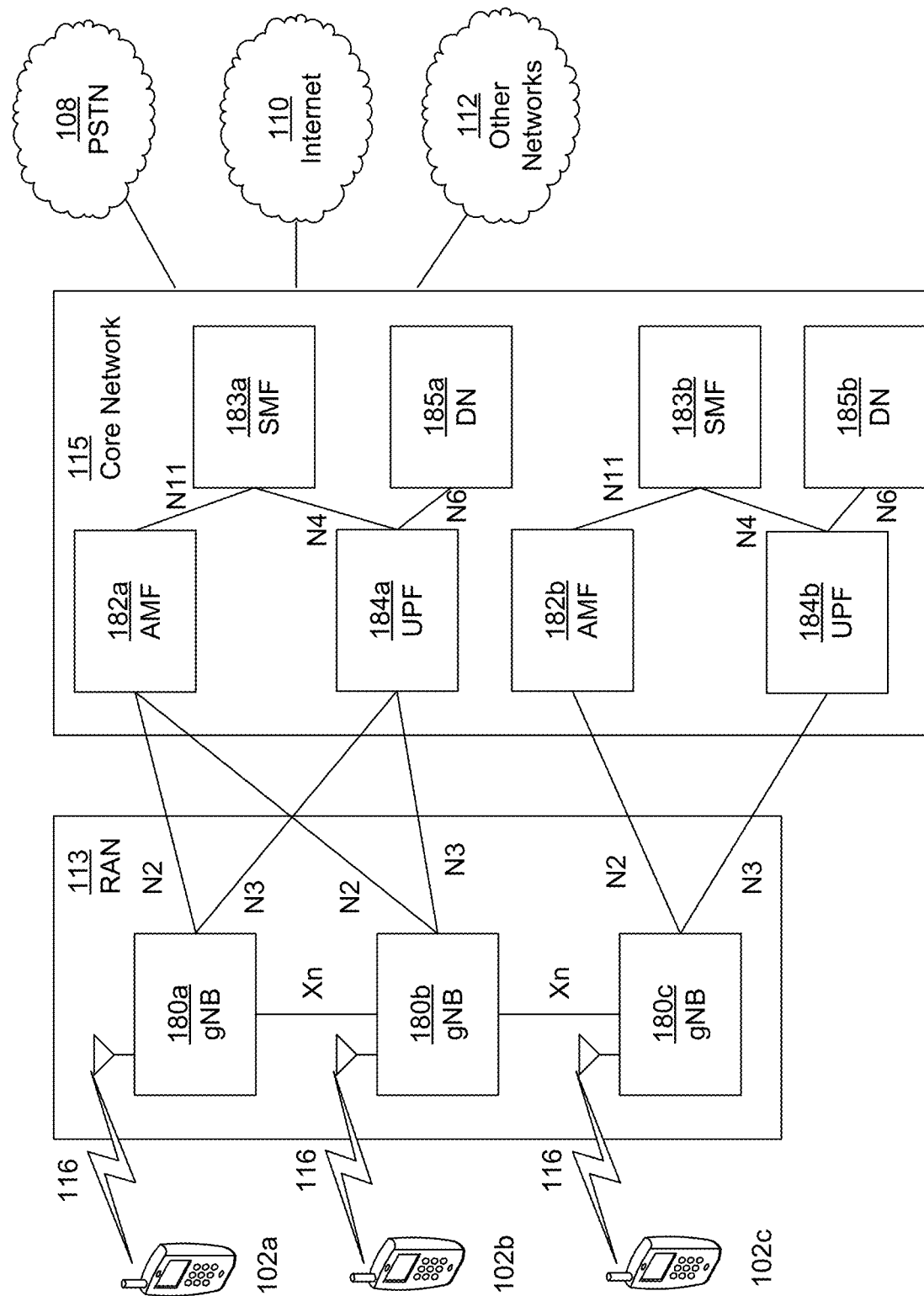
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Reference to a timer herein may refer to determination of a time or determination of a period of time. Reference to a timer expiration herein may refer to determining that the time has occurred or that the period of time has expired. Reference to a timer herein may refer to a time, a time period, tracking the time, tracking the period of time, etc.

Systems, methods, devices, and instrumentalities are described herein related to conditional triggers for flight path update indications.

A wireless transmit/receive unit (WTRU) may receive configuration information. The configuration information may indicate a trigger condition (e.g., threshold) associated with enabling transmission of a flight path update indication. The WTRU may determine that the threshold associated with enabling transmission of the flight path update indication is satisfied.

In examples, the threshold may be a distance threshold. The distance threshold associated with enabling transmission of the flight path update indication may be satisfied based on a distance between a position of the WTRU and a previously provided flight path location exceeding the distance threshold. In examples, the threshold may be a time-based threshold. The time-based threshold associated with enabling transmission of the flight path update may be satisfied based on a time of arrival at a waypoint location exceeding a previously reported time of arrival by the time-based threshold. In examples, the threshold may be a waypoint threshold. The waypoint threshold associated with enabling transmission of the flight path indication may be satisfied based on a number of invalidated waypoint(s) exceeding the waypoint threshold.

Based on the threshold being satisfied, the flight path update indication may be transmitted. In examples, the flight path update indication may be transmitted via a UE assistance information (e.g., WTRU assistance information) message or via radio resource control (RRC) signaling. The WTRU may receive a request to transmit the updated flight path information and transmit the updated flight path information.

Examples of configurations of flight path update indications and reporting are provided herein. A WTRU may receive a UE information request message (e.g., WTRU information request message) including a flight path reporting configuration requesting flight path information. The flight path reporting configuration (e.g., configuration information) may include at least one of: a number of waypoint(s); whether to include timestamp information; conditions and associated thresholds for triggering an updated flight path indication; a configuration to periodically report flight path information updates; or fallback candidate flight paths and/or waypoint(s) (e.g., additional fallback candidate flight paths and/or waypoint(s)) in case a deviation is needed.

A configuration for periodicity (e.g., configuration information for periodicity) may include one or more of: a periodicity; a window and/or resources to report an updated flight path; or scaling/biases to alter periodicity based on a speed and/or a location of the WTRU. Condition(s) for triggering an updated flight path indication may include one or more of: a distance and/or delay from an original reporting value exceeding a threshold; a number of invalidated waypoint(s) and/or timestamp(s) exceeding a threshold; a number of waypoint(s) and/or timestamp(s) exceeding a threshold (e.g., a number of new waypoint(s) and/or timestamp(s) available exceeding a threshold); or reception of a message initiating collision avoidance (e.g., from a CN).

Examples of triggering conditions for flight path update indications are provided herein. If one or more of the triggering condition(s) are satisfied, a WTRU may transmit an indication indicating that an updated flight is available. At a configured periodicity, the WTRU may evaluate whether flight path information has changed since a previous flight path report was transmitted (e.g., an initial flight path report was transmitted). If the previous flight path has changed (e.g., the previous flight path information is invalid or waypoint(s) (e.g., new waypoint(s)) are available), the WTRU may transmit an indication that updated flight path information is available (e.g., via UE assistance information (e.g., WTRU assistance information) examples). The WTRU may receive a request to transmit the updated flight path information. The WTRU may transmit the updated flight path information. If the previous flight path has not changed, the WTRU may transmit an acknowledgement that no change has occurred since the previous flight path report. If the configured periodicity is a skip occasion, the WTRU may retroactively indicate that an indication was skipped in the past (e.g., the past X indications were skipped).

Examples of partial and/or delta flight data reporting are provided herein. A WTRU may transmit updated partial and/or delta flight path information including one or more of: a flag to report signaling (e.g., report the waypoint and delta information from an initial flight path report); report waypoints and/or timestamp information is available (e.g., report new waypoint and/or timestamp information that is available); report waypoint(s) and/or timestamp(s); report information which has become invalid; or report information which has become invalid by a threshold.

Examples of fallback flight path applications are provided herein. A WTRU may evaluate candidate fallback waypoint(s) and/or flight paths to determine if one or more candidate fallback waypoint(s) and/or flight path(s) are suitable replacement route(s). If a suitable candidate is found, the WTRU may apply the fallback waypoint and/or flight path and may notify the network that a (e.g., pre-configured) fallback waypoint and/or flight path has been applied. In examples, the WTRU may indicate which waypoint and/or flight path has been updated (e.g., by transmission of an index). The WTRU may detect that an initial flight path is invalid and may notify the network. The WTRU may monitor for a network indication of an updated fallback waypoint and/or flight path to apply. If the WTRU receives one or more fallback waypoint(s) and/or flight path(s), the WTRU may update a currently maintained flight path (e.g., the initial flight path) and may transmit an acknowledgement (ACK) to the network that the updated flight path has been applied.

Examples of flight path reporting for uncrewed aerial vehicles (UAV) traveling at a height of up to 300 m have been provided. These examples may target use cases including drone operation, personal entertainment for flight experience, and/or cargo delivery. Examples of capability for remote control and data transmissions associated with flight path reporting may be provided.

Examples of flight path reporting is for aerial WTRUs based on WTRU capability are provided. Flight path information may include of a number of waypoint(s), which may be 3D locations. A WTRU may indicate if flight path information is available via RRCConnectionReconfigurationComplete, RRCConnectionReestablishmentComplete, RRCConnectionResumeComplete, or RRCConnectionSetupComplete messages. This may allow a network to know (e.g., immediately after) connection establishment, resumption, and/or modification whether flight path information is available, which may enable a subsequent flight path report configuration and request.

Figure 2:
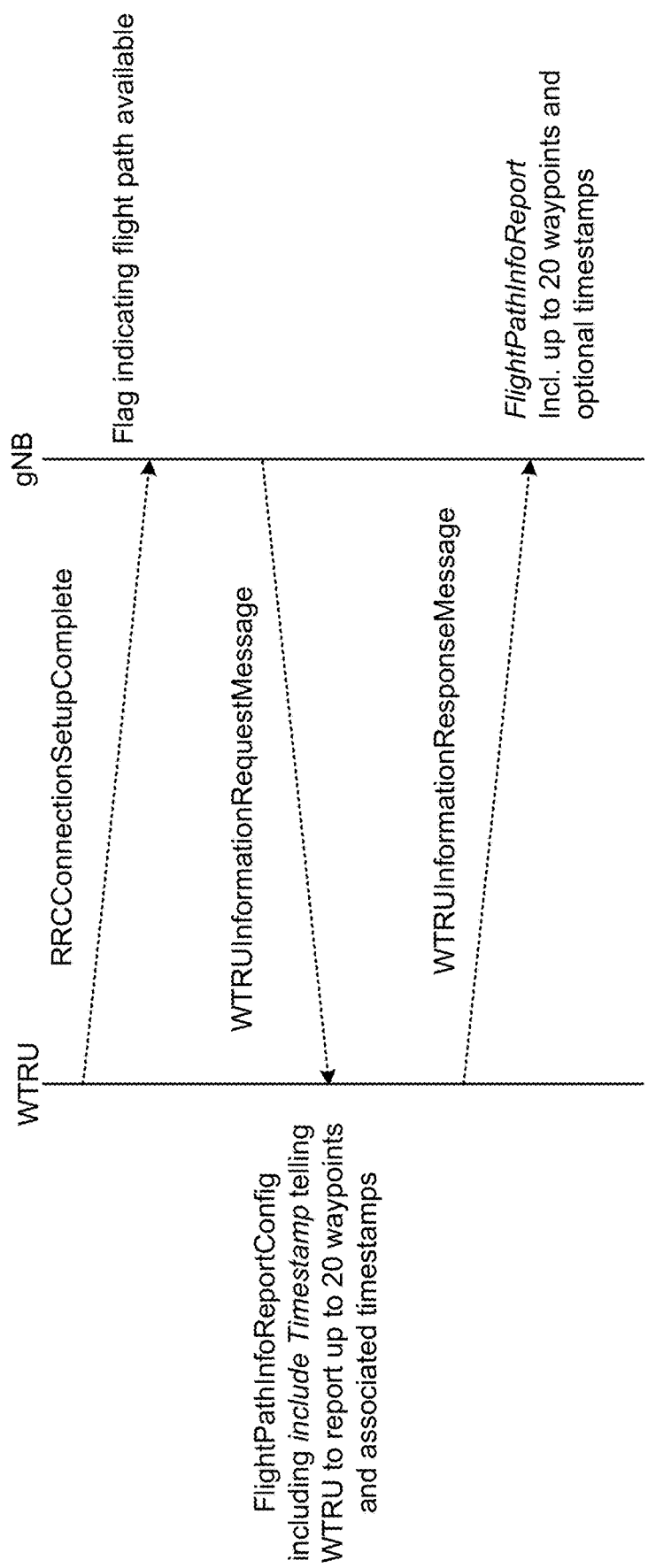
FIG. 2 illustrates an example signaling flow for a flight path report.

FIG. 2 illustrates an example signaling flow for a flight path report. E-UTRAN may request a WTRU to report flight path information via flightPathInfoReq in the UEInformationRequest message. If requesting to report WTRU flight path information, the WTRU may include flightPathInfoReport in the UEInformationResponseMessage including available waypoints (e.g., all available waypoints up to the configured maximum). Such information may be useful to the network (e.g., for collision avoidance, resource provisioning, and WTRU configuration). Supporting (e.g., currently supporting) configurations of up to 20 waypoint locations within a flight path report may be provided. RAN2 may confirm that a maximum of 20 waypoint locations may be sufficient for an NR use case.

A WTRU may (e.g., may additionally) be configured to include time stamp information associated to waypoints (e.g., each waypoint) via includeTimeStamp within FlightPathInforReportConfig. Time stamps may improve predictability of the WTRU location at a given time, further aiding planning of a WTRU configuration and future resource allocation. However, time stamp information may not always be known, and may (e.g., may only) be included in a flight path report if such information is available at the WTRU.

Examples of flight path reporting including flight path availability indications via radio resource control (RRC) complete messages may be provided. The flight path request and reporting via the UE information request and/or response (e.g., WTRU information request and/or response) procedure, and similar flight path report contents, may be provided.

Figure 3:
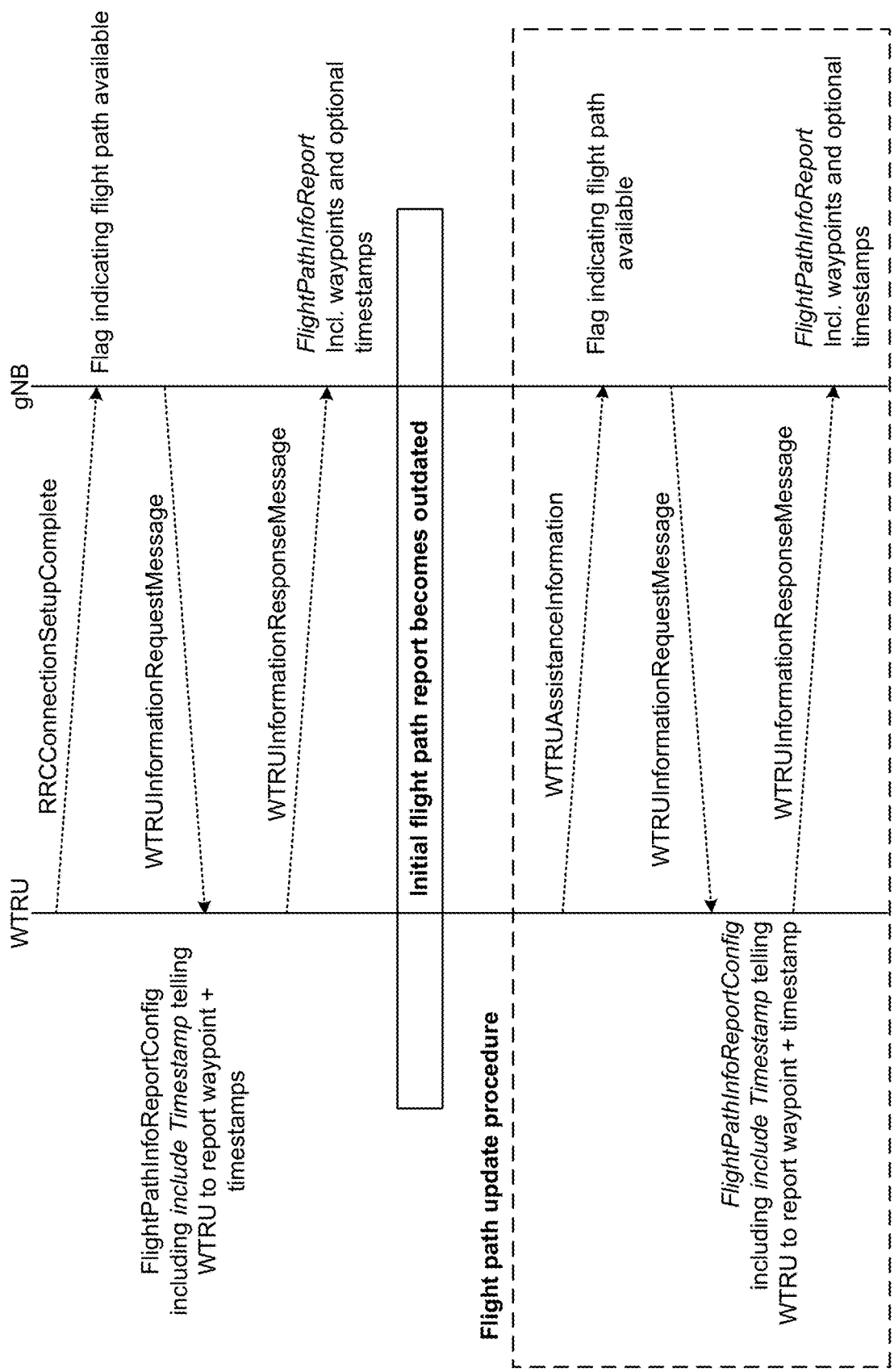
FIG. 3 illustrates an example uncrewed aerial vehicle (UAV) procedure to update an initial flight path report.

FIG. 3 illustrates an example procedure to update an initial flight path report. Examples of triggers to update flight path reports for UAVs are provided herein. During flight path reporting, if a flight path is not efficiently updated after the initial flight path report, this may create issues, for example, if a WTRU deviates from the planned flight path due to collision avoidance (e.g., possibly invalidating one or more reported waypoints or timestamps).

To maximize re-use of the existing reporting procedure, most the signaling may be re-used for update reporting, apart from indicating flight path availability which may be indicated in the UEAssitanceInformation message. The network may (e.g., may then) use the UE information request and/or response (e.g., the WTRU information request and/or response) procedure to retrieve the updated flight path. Excessive and unrestricted flight path update may lead to additional interference, signaling overhead, and could impact WTRU battery power consumption. Examples of maintaining flight path information at a desired accuracy level for the current needs of the WTRU/network while minimizing signaling overhead and interference are provided herein.

Example flight path update scenarios may include a WTRU that may perform an autonomous flight path update and may notify the network if a previously reported flight path is invalid or outdated. The examples may include trigger and contents of a flight path update indication and/or transmission and contents of an updated flight path report.

Example flight path update scenarios may include a WTRU that may be restricted to a set of candidate waypoint(s) and/or route(s). If a flight path is invalid, the WTRU may apply a fallback flight path. The examples may include a pre-configuration of fallback candidates and a WTRU autonomous application of flight path updates with subsequent notification. The network may provide fallback route(s) if the WTRU indicates the route is no longer valid.

Examples herein may refer to flight path reporting for UAV, however described examples may (e.g., may also) apply to other devices or circumstances where trajectory or path information is exchanged, for example, for autonomous vehicles, mobile relays/base stations attached to vehicles, etc. In such circumstances, a flight path may be exchanged for an equivalent interpretation (e.g., trajectory, itinerary, etc.).

Examples herein may consider at least one of the following: a WTRU may (e.g., may only) trigger a flight path update if the flight path change meaningfully impacts the accuracy (e.g., there may be some margin of error built into triggering conditions); a WTRU may (e.g., may only) update flight path information which has changed to minimize additional signaling overhead (e.g., information which has not changed wouldn't need to be retransmitted); a WTRU may have a better idea of a condition of a flight path than a network (e.g., so there may be cases where a WTRU would ignore an update request if information has not changed); or different conditions may apply if the WTRU is providing additional waypoint(s) vs. reporting an error in a previous flight path report.

Examples described within herein may enable an accurate flight path to be maintained (e.g., to ensure proper collision avoidance and resource allocation planning), while minimizing additional signaling overhead and interference.

Figure 4:
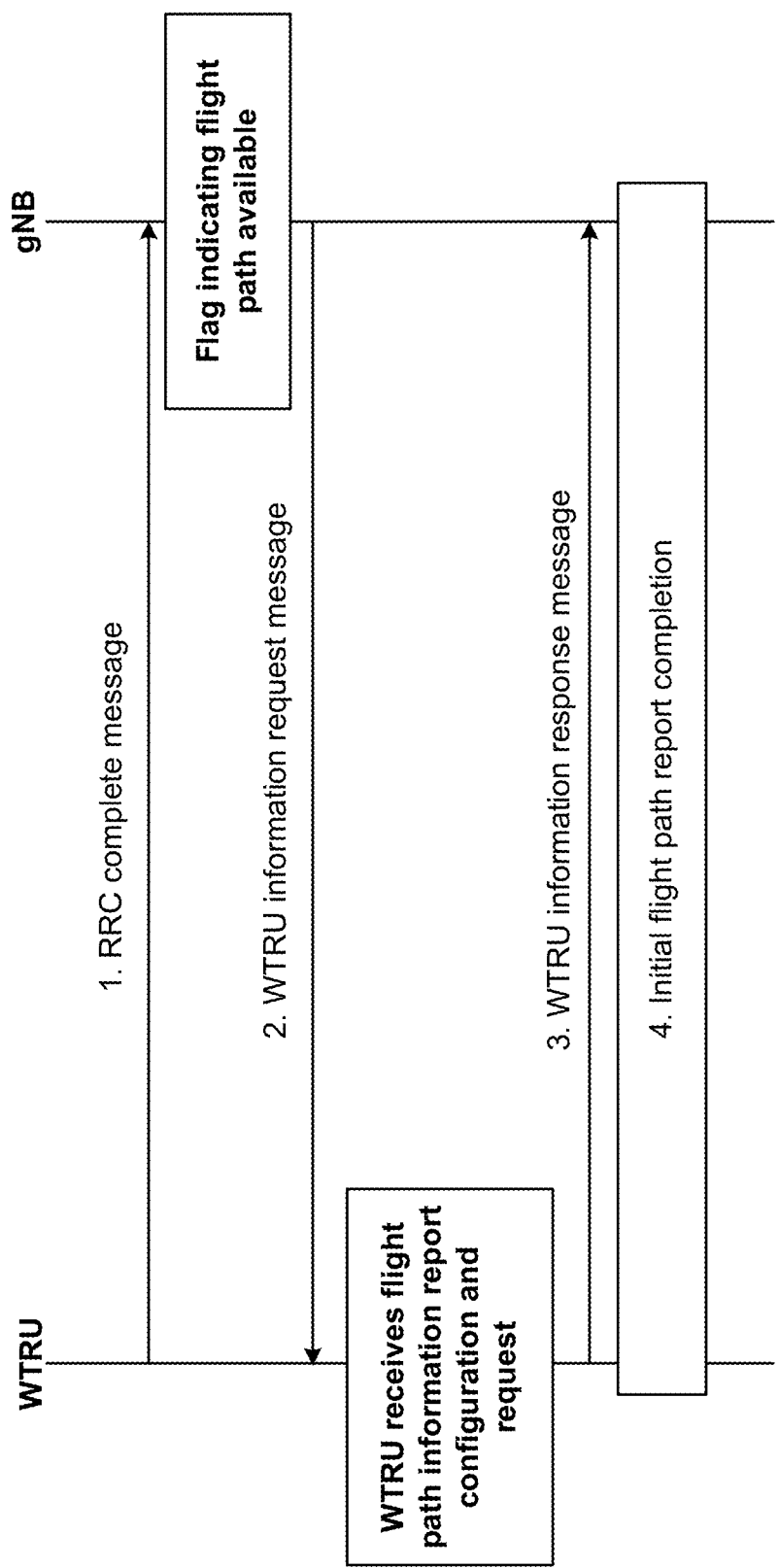
FIG. 4 illustrates an example of an initial flight path reporting procedure.

FIG. 4 illustrates an example of an initial flight path reporting procedure. A WTRU may indicate if flight path information is available via: RRCConnectionReconfigurationComplete, RRCConnectionReestablishmentComplete, RRCConnectionResumeComplete, or RRCConnectionSetupComplete messages. E-UTRAN may request a WTRU to report flight path information by including the flightPathInfoReq Information element (IE) in the UEInformationRequest message. In this IE, the network may include the number of waypoint(s) to be reported by the WTRU (e.g., up to a maximum of 20) and may (e.g., may also) request timestamp information. The WTRU may respond to the UEInformationRequest by including the flightPathInfoReport IE in the UEInformationResponseMessage, which may include waypoint(s) (e.g., all available waypoint(s) up to the configured maximum and timestamp information if requested by the network and available at the WTRU.

Example UAVs may adopt a similar flight path reporting content (e.g., waypoint(s) and optional timestamp(s) and initial reporting procedures. Example UAVs may (e.g., may additionally) update a previously reported flight path via an indication in the UE assistance information message (e.g., the WTRU assistance information message). The network may use the legacy UE information request and/or response (e.g., the legacy WTRU information request and/or response) procedure (e.g., if indicated) to retrieve an updated flight path (e.g., or may use the legacy UE information request and/or response (e.g., the legacy WTRU information request and/or response) procedure in other examples herein). A UE assistance information message may be referred to as a WTRU assistance information message herein. A UE information request may be referred to as a WTRU information request herein. A UE information response may be referred to as a WTRU information response herein.

A WTRU may receive the value of at least one parameter of a configuration (e.g., configuration information) for triggering a flight path update (e.g., an indication and/or report) from an RRC, a MAC, or downlink control information (DCI) signaling (e.g., a trigger condition associated with enabling transmission of a flight path update indication). In examples, the WTRU may receive the configuration information within the initial flight path reporting configuration (e.g., within a UE information request message (e.g., WTRU information request message) or within an HO command (e.g., within an RRC reconfiguration with sync message).

The WTRU may receive multiple configurations for triggering a flight path update. Configurations (e.g., each configuration) may be identified by an index and may receive an indication of the applicable configuration from the signaling. Configurations may be specific to one or more of the following: a cell (e.g., the serving cell) or group of cells; a TRP or a group of TRPs; or a location (e.g., waypoint) or range of locations.

The WTRU may determine at least one value from one of more of: system information; a dedicated RRC message (e.g., an RRC reconfiguration, an RRC connection release); a field of a random access response (RAR) message; or a property of the RAR grant. In examples, the WTRU may determine the value of a configuration index from a number of most or least significant bits of a modulation and coding scheme (MCS) field or from a time domain resource allocation (TDRA) field. The mapping between the bits and the corresponding values may be pre-defined or may be signaled by an RRC.

The at least one parameter or configuration index may be determined from a combination of the above examples. A configuration and/or an indication by the network may be received with a first message and may (e.g., may then) be enabled/disabled by the network signaling (e.g., MAC CE, DCI, SIB, RRC, random access channel (RACH) message, etc.) in a second message.

A WTRU may transmit a flight path update indication (e.g., an indication that the current flight path has changed from the most recent flight path report) and/or an updated flight path report (e.g., a full flight path report including waypoints and timestamps or a delta/partial flight path report) via one or more of the following: UE assistance information (e.g., WTRU assistance information); a UE information response message (e.g., a WTRU information response message); RRC signaling; a MAC CE; a RACH msg (e.g., MSG3, MSG5, MSGA); a configured grant occasion; an L1 report, or a scheduling request.

Examples of contents for a flight path update indication are provided herein. The flight path update indication may include a flag that current flight path information has changed from a previously reported flight path. In examples, the WTRU may send additional and/or more detailed information regarding the status of the current flight path. The WTRU may transmit one or more pieces of information within the flight path update indication: time information is invalid; waypoint information is invalid; a number of timestamp(s) and/or waypoint(s) that are invalid; the level of change (e.g., small change, big change, percentage change, value of change), where the WTRU may determine the level of change based on network configuration; a number of timestamp(s) and/or waypoint(s) that are available (e.g., new timestamp(s) and/or waypoint(s) that are available); a number of waypoint(s) to be added (e.g., new waypoint(s) to be added); or a number of waypoint(s) to be removed.

Examples of detecting that a previously reported flight path is no longer valid (e.g., and enabling transmission of the flight path update indication) are provided herein. In examples, the WTRU may determine whether the flight path information is considered to be changed and/or invalid (e.g., enabling transmission of the flight path updated indication) autonomously (e.g., based on WTRU implementation) if at least one of the following conditions or combination thereof occurs: an actual position of the WTRU has deviated from the planned position (e.g., a previously provided flight path location) at a given time by more than a threshold (e.g., first distance threshold); an actual position of the WTRU has deviated from the closest position of the flight path by more than a threshold (e.g., second distance threshold); the distance between an actual position of the WTRU and the closest position of a (valid) fallback flight path is smaller than the distance between WTRU actual position and the closest position of current flight path, minus a threshold (e.g., third threshold); the WTRU receives an indication from the network (e.g., by an RRC) that the current flight path is to be considered invalid; the WTRU receives an indication from a UAV-controlling entity or from another UAV that the current flight path is to be considered invalid; if the expected/anticipated time of arrival for a certain waypoint or sets of waypoints (e.g., a previously reported time of arrival) differs from the current flight path information (e.g., time of arrival at a current waypoint location) by a certain duration (e.g., a time-based threshold); if the expected/anticipated waypoint at a certain time differs from the waypoint indicated in the current flight path information by a certain distance; if the WTRU does not expect to be within a certain configured radius/distance from the waypoint; if the WTRU does not expect to be at a waypoint within a certain configured time from the time it is expected to be at that waypoint; the number of or percentage of waypoint(s) (e.g., in the current flight path info available at the network) that the WTRU expects not to pass through (e.g., invalidated waypoint(s) is above/below a threshold (e.g., a waypoint threshold); if the WTRU has not reached a waypoint that it was expected to reach at the time the periodic reporting is triggered; if the WTRU has not traversed a certain number of or percentage of the waypoint(s) that it was expected to pass through at the time the periodic reporting is triggered; or if the mobility state of the WTRU has changed by a certain level from the previous period where the periodic reporting was triggered and/or sent (e.g., the WTRU speed has changed by a certain amount, percentage level, etc.). The WTRU may receive first, second, and third distance thresholds by signaling such as an RRC message.

Examples of conditional triggers for flight path updates are provided herein. In examples, the WTRU may be configured to send an indication to the network that its flight path information is updated, based on one or more conditions (e.g., based on the one or more trigger conditions and/or thresholds being satisfied). The WTRU may send the updated flight path if (e.g., subsequently) requested by the network. In examples, the WTRU may perform one or more of the following.

A WTRU may transmit a first message (e.g., an RRC connection complete message) indicating flight path information is available. A WTRU may receive a second message (e.g., a UE information request message (e.g., WTRU information request message) including flight path reporting configuration requesting flight path information. The flight path reporting configuration (e.g., configuration information) may include at least one of: a number of waypoint(s); whether to include timestamp information; or conditions (e.g., and associated thresholds) for triggering an updated flight path indication (e.g., triggering conditions for indicating an updated flight path indication is available). The WTRU may transmit an initial flight path report within a third message (e.g., a UE information response message (e.g., a WTRU information response message).

The WTRU may monitor condition(s) (e.g., and associated threshold(s) for triggering an updated flight path indication (e.g., triggering condition(s) and threshold(s) for indicating an updated flight path indication is available). The condition(s) for triggering an updated flight path indication may include one or more of: a distance and/or delay from an original reported value exceeding a threshold (e.g., a distance threshold); a number of invalidated waypoint(s) and/or timestamp(s) exceeding a threshold (e.g., a waypoint threshold); a number of waypoint(s) and/or timestamp(s) available exceeding a threshold (e.g., a number of new waypoint(s) and/or timestamps(s) available exceeding a threshold); or a reception of a message initiating collision avoidance (e.g., from a CN).

If one or more triggering condition(s) associated with enabling transmission of the flight path update indication are satisfied, the WTRU may transmit an indication that an updated flight path is available. The WTRU may receive a request to transmit updated flight path information. The WTRU may transmit the updated flight path information.

Figure 5:
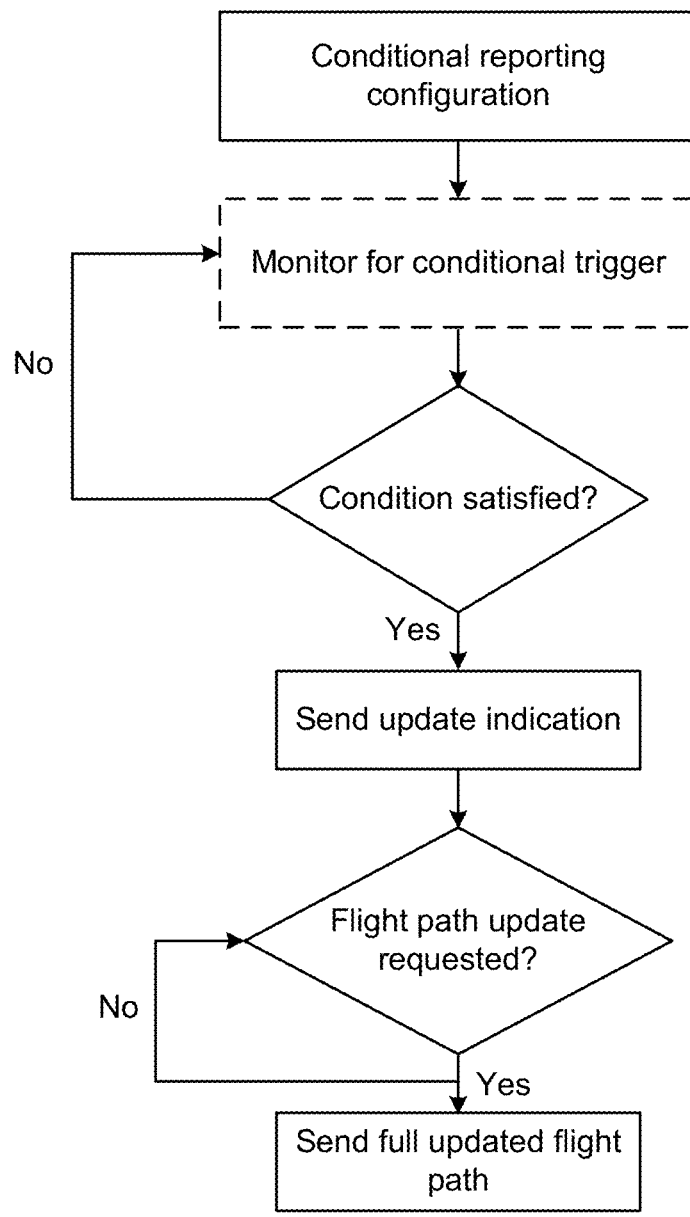
FIG. 5 illustrates an example of a conditional trigger for an updated indication.

FIG. 5 illustrates an example of a conditional trigger for an updated indication. The trigger condition(s) associated with enabling transmission of a flight path update may include one or more of the following: a threshold associated with enabling transmission of a flight path update indication; a specific value associated with enabling transmission of a flight path update indication; or a range of values associated with enabling transmission of a flight path update indication. For a threshold, the condition may be satisfied if the measured value is above, below, or equal to a threshold value. For a specific value, the condition may be satisfied if the measured value is equal to one or more indicated values. For a range of values, the condition may be satisfied if the measured value falls within a range (e.g., in other examples, the condition may be satisfied if the measured value falls outside of an indicated range).

In examples, the conditions for triggering the flight path update report or indication according to any of the examples herein may include an (e.g., additional) time to trigger (TTT) configuration, where the conditions may be fulfilled for the TTT before the WTRU considers the condition to be fulfilled and an update report or indication is triggered. In examples, the conditional flight path update reporting or change indication configuration may be released and/or deleted after the WTRU has triggered a report or update indication based on that configuration. In examples, the WTRU may use the conditional flight path update reporting or change indication (e.g., until the network has indicated to the WTRU to release it). In examples, the flight path update report may be sent at a lower priority than other RRC messages (e.g., a measurement report) by sending the report via SRB2.

Examples of conditional flight paths being updated or triggering conditions being reported are provided herein. The conditions for triggering a flight path update indication or report may be time related. For example, the WTRU may be configured to trigger the flight path update indication or report if the expected/anticipated time for a certain waypoint or sets of waypoints (e.g., a previously reported time of arrival) differs from the current flight path information (e.g., a time of arrival at a waypoint location) by a certain duration (e.g., a time-based threshold). This may be: a delay duration (e.g., the WTRU expects to arrive at a waypoint later than the reported time in the flight path the WTRU has previously reported to the network); a pre-arrival duration (e.g., the WTRU expects to arrive at a waypoint earlier than the reported time in the flight path the WTRU has previously reported to the network); or an uncertainty window (e.g., the WTRU expects to arrive at a waypoint earlier or later than the reported time in the flight path the WTRU has previously reported to the network).

The conditions for triggering a flight path update indication or report may be distance related. For example, the WTRU may be configured to trigger a flight path update indication or report if the expected/anticipated waypoint at a certain time differs from the waypoint indicated in the current flight path information by a certain distance (e.g., a distance between a position of the WTRU and a previously provided flight path location exceeding a distance threshold). This could be: a delay (e.g., the WTRU may expect to be a certain distance behind the waypoint at the time it was indicated to be at that waypoint in the flight path information the WTRU has previously reported to the network); a pre-arrival (e.g., the WTRU may expect to be a certain distance farther ahead from the waypoint at the time it was indicated to be at that waypoint in the flight path information the WTRU has previously reported to the network); or an uncertainty window (e.g., the WTRU may expect to be a certain distance in front or behind the waypoint at the time it has indicated to be at the waypoint in the flight path the WTRU has previously reported to the network).

The delay/pre-arrival/uncertainty window time or distance duration(s)/value(s) may refer to all waypoints, a subset of the waypoints, or just one particular waypoint.

A triggering condition for a flight path update indication or report may be the number of or percentage of waypoint(s) (e.g., in the current flight path information available at the network) that the WTRU expects not to pass through (e.g., invalidated waypoints) exceeding a threshold (e.g., a waypoint threshold). A distance threshold may be configured to determine if the WTRU can consider a waypoint invalid (e.g., a waypoint may be configured to be invalid if the WTRU does not expect to be within a certain configured radius/distance from the waypoint). A time threshold may be configured to determine if the WTRU can consider a waypoint invalid (e.g., a waypoint may be configured to be invalid if the WTRU does not expect to be at the waypoint within a certain configured time from the times it is expected to be at that position in the (e.g., according to the) flight path information available at the network).

In examples, the WTRU may be configured to send a flight path update indication or report if it reaches or in the vicinity of a certain waypoint (e.g., within a certain configured radius from some waypoint). In examples, the WTRU may be configured to send a flight path update indication or report if it has passed a certain number of or a percentage of the waypoints that were previously indicated in the flight path information. For example, the WTRU may be configured to update the flight path if it has traversed halfway through the flight path it has previously indicated. In examples, the WTRU may be configured to send a flight path update indication or report if it detects that its mobility has changed by a certain threshold. For example, the WTRU may trigger the report or update indication if its speed/acceleration has changed by more than a certain percentage or absolute value as compared to the time when the previous flight path information was sent to the network. In examples, the update or update indication may be triggered if the WTRU has changed its mobility state from low mobility to high mobility, where low and high mobility state may be based on network configured speed value ranges. The speed/acceleration/mobility changes may be axis dependent (e.g., speed change in the x, y, or z axis). In examples, the WTRU may be configured to send a flight path update indication or report if the WTRU detects that its height has changed by a certain threshold from the time when the flight path information was last sent to the network.

The RAN may get information about the WTRU flight path from another entity other than the WTRU (e.g., CN, application servers, etc.). The network may send the flight path information to the WTRU, which may inform the WTRU to send a flight path update indication or report (e.g., if the WTRU strays away from the current flight path information, according to any of the examples herein). Some of the waypoints in the flight path information may have a higher importance than the others. The WTRU may be configured to (e.g., only to) consider those waypoints or prioritize the conditions related to those waypoints if checking for the triggering of the flight path update indication.

Examples of sending an updated flight path report instead of an update indication are provided herein. In examples, the WTRU (e.g., instead of sending an indication to the network that its flight path information is updated) may send the updated flight path (henceforth also referred to as a flight path report).

The WTRU may be configured with at least one set of conditions associated with sending an indication to the network that its flight path has changed and at least another set of conditions to send the (e.g., updated) flight path report directly (e.g., without sending an indication to the network and waiting for the network to request it). The different configurations of the triggering conditions for the flight path update indication or report may be uniquely identified (e.g., by an integer value) and the WTRU may include the identity of the configuration and/or condition that triggered the flight path indication or report in the update indication or report that the WTRU sends to the network. The WTRU may be configured to send an updated flight path report if the WTRU has uplink (UL) grants available that are sufficient enough to send the report. The WTRU may (e.g., otherwise) send (e.g., just) an indication that a flight path update is available.

Examples of an explicit request for a flight path status are provided herein. In examples, the WTRU may periodically report the flight path status (e.g., based on a configuration and/or in response to an explicit request from the network). The WTRU may send the updated flight path report (e.g., if subsequently requested by the network). In examples, the WTRU may perform one or more of the following.

The WTRU may transmit a first message (e.g., an RRC connection complete message) indicating flight path information is available. The WTRU may receive a second message (e.g., a UE information request message (e.g., a WTRU information request message)) including a flight path reporting configuration requesting flight path information. The flight path reporting configuration (e.g., configuration information) may include at least one of: a number of waypoint(s); whether to include timestamp information; or a configuration to periodically report flight path information updates. The configuration for periodicity may include one or more of: a periodicity; a window and/or resources to report an updated flight path; or scaling/biases to alter periodicity based on a speed/location of the WTRU. The WTRU may transmit an initial flight path report (e.g., within a third message or a UE information response message (e.g., WTRU information response message)).

At a configured periodicity, the WTRU may evaluate whether flight path information has changed since a previous flight path report (e.g., initial flight path report). If the flight path information has changed (e.g., previous flight path information is invalid or waypoint(s) (e.g., new waypoint(s)) are available), the WTRU may transmit an indication that updated flight path information is available (e.g., via UE assistance information (e.g., WTRU assistance information) examples). The WTRU may receive a request to transmit an updated flight path information. The WTRU may transmit the updated flight path information. If the flight path information has not changed, the WTRU may transmit an ACK that there has been no change since the previous flight path report. If the configured periodicity is a skip occasion, the WTRU may retroactively indicate that an indication was skipped in the past (e.g., past X indications were skipped). In examples, the WTRU may apply the above behavior if the network autonomously requests a flight path information update (e.g., without a prior transmission of a WTRU update indication).

Figure 6:
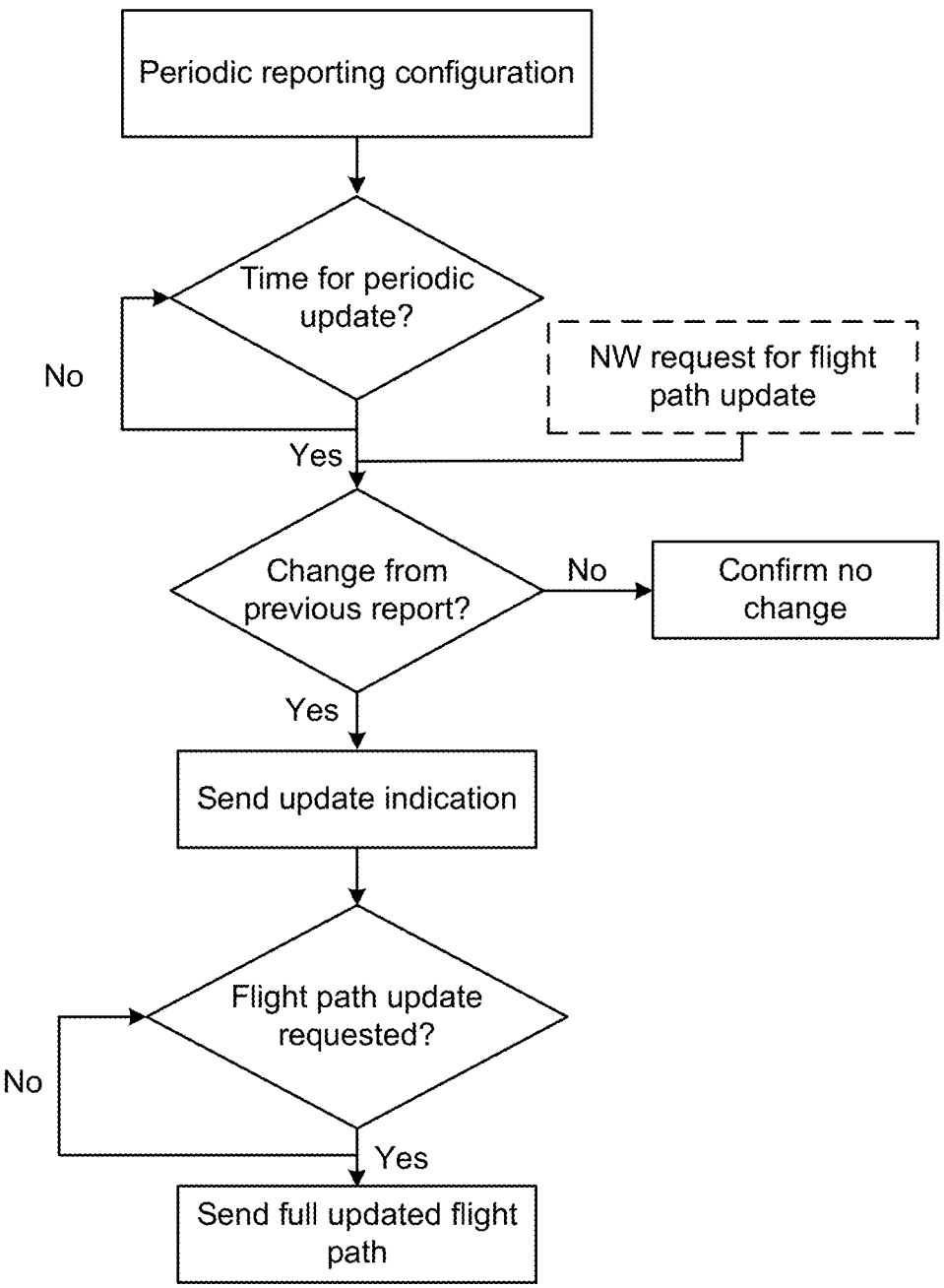
FIG. 6 illustrates an example of a periodic or network requested trigger for a flight path status indication.

FIG. 6 illustrates an example of a periodic or network requested trigger for a flight path status indication. A WTRU may be configured to periodically report the status of a flight path. At configured periodicities, the WTRU may compare the current flight path with the previously reported flight path. A periodic configuration may include one or more of the following aspects: a periodicity; a window and/or resources to report an updated flight path, or scaling/biases to alter periodicity based on the speed and/or location of the WTRU. For the window and/or resources to report an updated flight path, the WTRU may be configured with configured grants (e.g., that periodically match the periodicity of the flight path related reporting). The WTRU may use the resources to send the flight path update report or indication. For scaling/biases to alter the periodicity based on speed and/or location of the WTRU, if the WTRU is considered to be in a high-mobility state or high-speed state, the WTRU may scale the periodicity of reporting.

In examples, the WTRU may receive a request from the network to report the status of the flight path information, for example, via RRC signaling (e.g., such as the UE information request message (e.g., a WTRU information request message)). The network may indicate one or more of the following (e.g., in addition to the request): resources (e.g., an UL grant) to respond to the network request; whether to send an ACK/NACK if nothing has changed or to skip the response entirely; or conditions to reply that a flight path has changed (e.g., the WTRU may report that the flight path has changed if it has changed by X % from the previous reported flight path).

If reaching the periodic trigger (e.g., or if receiving a network request), the WTRU may compare the current status of the flight path with the last reported flight path. In examples, the WTRU may not send a flight path status if the flight path information has not changed. In examples, the flight path status may be a simple indication (e.g., Yes or No, ACK or NACK) that may indicate whether the flight path information has changed or not. In examples, the WTRU may send an indication if the flight path has not changed. In examples, the WTRU may send the updated flight path if the flight path has changed. If the WTRU is configured with a configured grant occasion to report a status update, the WTRU may determine to send the status indication, or the full report, based on the size of the configured grant available at that time.

If the WTRU has down prioritized the sending of a flight path status or a flight path update report (e.g., due to other high priority data or the current flight path is unchanged), it may send the flight path status or the flight path updated report whenever UL resources become available afterward, or it may skip entirely until the next reporting period. If the WTRU has skipped an occasion, the WTRU may retroactively indicate that one or more indications were skipped at the next occasion that a WTRU transmits an ACK/update indication.

The WTRU may be configured to down prioritize the sending of a flight path status or flight path report (e.g., even if a configured grant was available) if there is a high priority data to be sent (e.g., via measurement report). For example, this may be accomplished by associating the flight path report with SRB2.

Examples of partial and/or delta updated flight path reporting are provided herein. A WTRU may report partial and/or delta information to convey an updated flight path report (e.g., if requested by the network). The WTRU may perform one or more of the following.

A WTRU may transmit a first message (e.g., an RRC connection complete message) indicating a flight path information is available. The WTRU may receive a second message (e.g., a UE information request message (e.g., a WTRU information request message)) including flight path reporting configuration requesting flight path information. The WTRU may transmit an initial flight path report within a third message (e.g., a UE information response message (e.g., WTRU information response message)). The WTRU may detect that a previously reported flight path (e.g., the initial flight path) requires updating (e.g., based on information associated with changing from the previous flight path to the updated flight path).

The WTRU may transmit an indication that an updated flight path is available. The indication may include the information (e.g., additional detailed information) about differences associated with changing from a previous flight path report to an updated flight path report. The information may include a flag indicating an updated flight available; a flag indicating time information invalid; a flag indication waypoint information invalid; a number of time and/or waypoint(s) that are invalid; or a number of timestamp(s) and/or waypoint(s) that are available (e.g., a number of new timestamp(s) and/or waypoint(s) that are available).

The WTRU may receive a request for partial and/or delta flight path information. The WTRU may transmit the updated partial and/or flight path information. The updated partial and/or flight path information may include one or more of the following: a flag to report delta signaling (e.g., report the waypoint and delta information from the initial flight path report); reporting waypoint/timestamp information that is available (e.g., new waypoint/timestamp information that is available); reporting waypoint(s) or timestamp(s);

reporting information which has become invalid; or report information which has become invalid by a threshold. The WTRU may receive an ACK that partial and/or delta flight path information is received.

Figure 7:
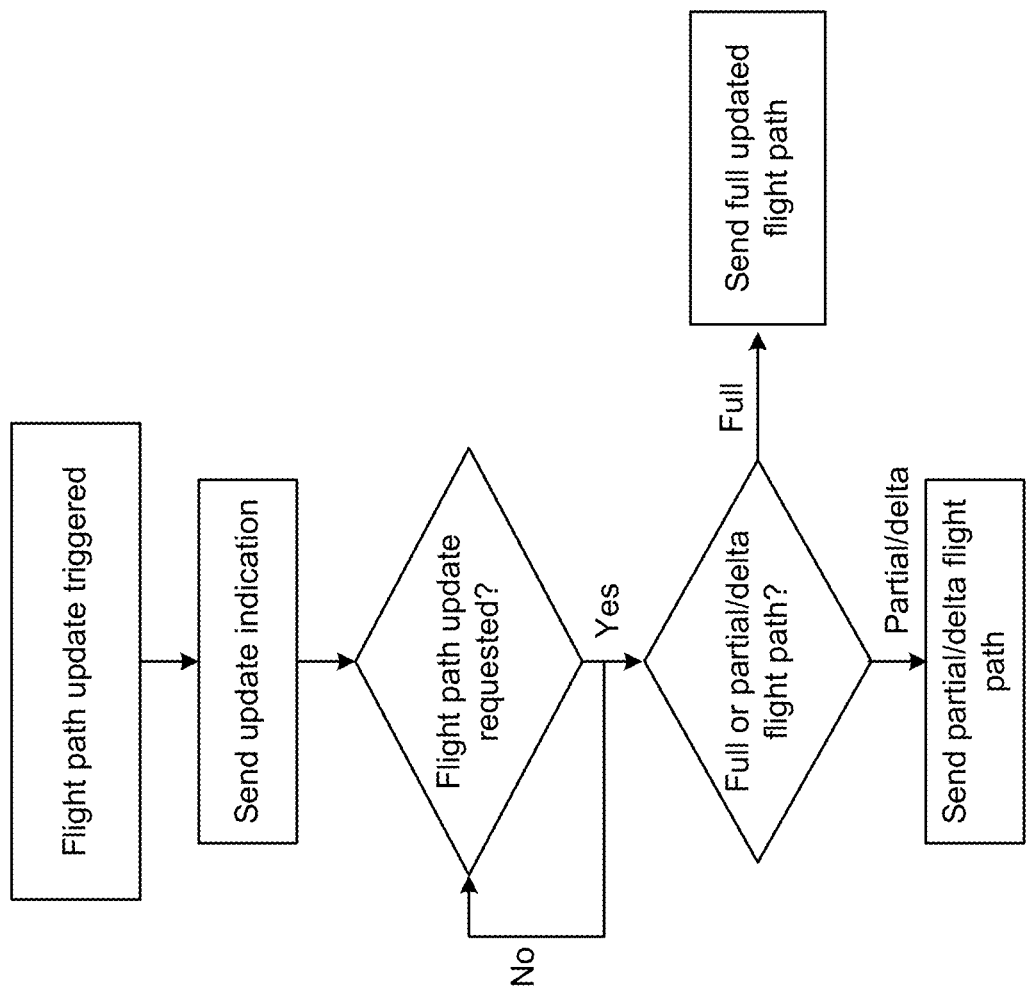
FIG. 7 illustrates an example of a partial and/or delta update indication.

FIG. 7 illustrates an example of a partial and/or delta update indication. If a WTRU detects that a flight path is invalid (e.g., based on satisfaction of one or more conditions listed in examples herein), the WTRU may send an indication that the flight path information is changed. The network may request the WTRU to send the full path information or a delta information that includes the changes (e.g., only the changes). The network may request delta path information for one or more waypoint(s). For example, the network may include in the request: one or more waypoint indexes (e.g., a list of indexes, range of indexes, etc.); one or more timestamp(s) or timestamp range(s) (e.g., which may be interpreted by the WTRU to mean that the network requests update(s) for the waypoint(s) that were previously indicated to be reached at the indicated timestamp range(s) or waypoint(s) that are currently expected by the WTRU to be reached at the indicated timestamp range(s)); waypoint(s) that are expected to change in distance from the ones indicated in the current path information by a certain distance; waypoint(s) that are expected to arrive at by a time that is different by more than a certain threshold from the timestamp indicated by the current flight information; or waypoint(s) that are considered to be invalid (e.g., that the WTRU may not expect to pass through anymore).

The WTRU may directly send the delta information to the network if determining that the flight path information has changed (e.g., instead of sending an indication and then waiting for the network to request the delta information). The flight path report/information of the WTRU may include an index/identification of waypoint(s), and the corresponding waypoint coordinates and optional timestamp information (e.g., when the WTRU may be expected to be at that waypoint). The WTRU may send an indication to the network that includes (e.g., only includes) the index/identification of the waypoint, updated waypoint coordinates, and/or an updated timestamp. An example is shown below in Table 1:

TABLE 1

Initial fight path information sent the network

| Index | Waypoint | Timestamp |
|---|---|---|
| 1 | Coordinates1 | T1 |
| 2 | Coordinates2 | T2 |
| 3 | Coordinates3 | T3 |
| ... | ... | ... |

If the WTRU determines that information about a certain waypoint has changed, then the WTRU may send a delta information (e.g., in a structure similar to AddMod Lists used by RRC messages). For example, the following structure below in Table 2 may be used to indicate to the network the change of the coordinates of waypoint 2, the change of the timestamp of waypoint 3, and the change of coordinates and timestamp for waypoint n:

TABLE 2

An example of a WaypointAddModList

| Index | Updated Waypoint | Updated Timestamp |
|---|---|---|
| 1 | — | — |
| 2 | W2_new | — |
| 3 | — | T3_new |
| ... | ... | ... |
| n | Wn_new | tn_new |

In examples, the waypoint coordinate or timestamp values indicated in the delta flight path update may be absolute values. In examples, the waypoint coordinate or timestamp values indicated in the delta flight path update may be relative to the previous values for the indicated waypoint (e.g., the network may add/subtract the indicated values from the previous values for the concerned waypoint to get the waypoint coordinates or timestamps).

The delta information sent for a given waypoint may be applicable to waypoint(s) (e.g., all subsequent waypoint(s) afterwards) and the WTRU may include such an indication in the waypoint indication. For example, the WTRU may explicitly indicate that the delta information is propagative (e.g., as shown in Table 3 below).

TABLE 3

An example of a WaypointAddModList with propagation condition (assuming absolute values indicated)

| Propagate? | Index | Updated Waypoint | Updated Timestamp |
|---|---|---|---|
| Yes | 10 | W2_new | — |
|  | 13 | — | T3_new |

If the delta update is received, the network may consider the coordinate of waypoint(s) (e.g., all waypoint(s) with an index greater than or equal to 10 to be updated by (w2_new−w2_old), and the timestamp for waypoint(s) (e.g., all waypoint(s)) with indexes greater than or equal to 13 to be updated by (t3_new−t3_old). The propagation indication may be at a message level (e.g., as shown in examples here) or it may be at waypoint level. An example at the waypoint level is shown below in Table 4:

TABLE 4

An example of a WaypointAddModList with propagation condition (assuming absolute values indicated)

| Propagate? | Index | Updated Waypoint | Updated Timestamp |
|---|---|---|---|
| Yes | 10 | W2_new | — |
| No | 13 | — | T3_new |

In examples, the absence of a propagate indication may be interpreted as a NO indication (e.g., that the delta update may be applicable only to the concerned waypoint). In examples, the absence of a propagate indication may be interpreted as a YES indication (e.g., that the delta update may be applicable to all subsequent waypoint(s).

The delta update may include information regarding waypoint(s) to be removed from the flight path. For example, WayPointToReleaseList=Indexes: 10, 13, 15 which may indicate to the network that waypoints 10, 13 and 15 are not valid (e.g., no longer valid) and can be removed.

The release of waypoints may be propagative or not (e.g., similar to the modification of waypoints). For example, the removal of waypoint 13 may be interpreted by the network that waypoint(s) (e.g., all waypoint(s)) with indexes 13 or above are to be removed from the flight path information. In examples, if a waypoint is removed, the indexes of the other waypoint(s) may not be affected. In examples, if a waypoint is removed, the indexes of the waypoint(s) with indexes above this waypoint may be reduced by 1 to accommodate the change. For example, if the WTRU has 3 waypoints in the flightpath, and the WTRU has sent an indication that waypoint #2 is to be released, then old waypoint #3 may take an index value of 2.

To prevent errors (e.g., additional errors) cascading (e.g., due to incorrectly received delta signaling) and to ensure proper alignment between the WTRU and network on the current status of the flight path, the WTRU may receive an ACK from the network that partial and/or delta flight path information has been successfully received. If the WTRU does not receive such an ACK (e.g., within a time period after the delta flight path report), the WTRU may transmit (e.g., another) flight path report including the full values.

Examples of pre-configured fallback waypoint(s) and/or flight path(s) are provided herein. The WTRU may fallback to an alternative preconfigured flight path and/or waypoint. The WTRU may perform one or more of the following.

A WTRU may transmit a first message (e.g., an RRC connection complete message) indicating a flight path information is available. The WTRU may receive a second message (e.g., a UE information request message (e.g., a WTRU information request message)) including a flight path reporting configuration requesting flight path information and candidate fallback waypoint(s) or updated flight path(s) (e.g., additional candidate fallback waypoints or updated flight paths). The WTRU may transmit an initial flight path report within a third message. The WTRU may detect if a previously reported flight path (e.g., the initial flight path) is invalid.

The WTRU may evaluate the candidate fallback waypoint(s) and/or updated flight path(s) to determine if one or more is a suitable replacement route. In examples, if a suitable candidate is found, the WTRU may apply the one or more fallback waypoint(s) and/or updated flight path(s). The WTRU may notify the network that the (e.g., pre-configured) fallback waypoint(s) and/or updated flight path(s) have been applied.

In examples, the WTRU may indicate which waypoint(s) and/or updated flight path(s) have been updated (e.g., by transmission of an index). In examples, if a suitable candidate is found, the WTRU may send a request to confirm whether the WTRU can apply the (e.g., preconfigured) fallback waypoint(s) and/or updated flight path(s). The WTRU may receive a response regarding the approval of the candidate fallback waypoint(s) or updated flight path(s). If the candidate(s) are approved, the WTRU may acknowledge the approval and apply one or more of the fallback waypoint(s) or the updated flight path(s). If the candidate(s) are rejected, the WTRU may perform an autonomous update procedure. If no suitable candidate is found, the WTRU may perform an autonomous flight path update and notify the network.

Figure 8:
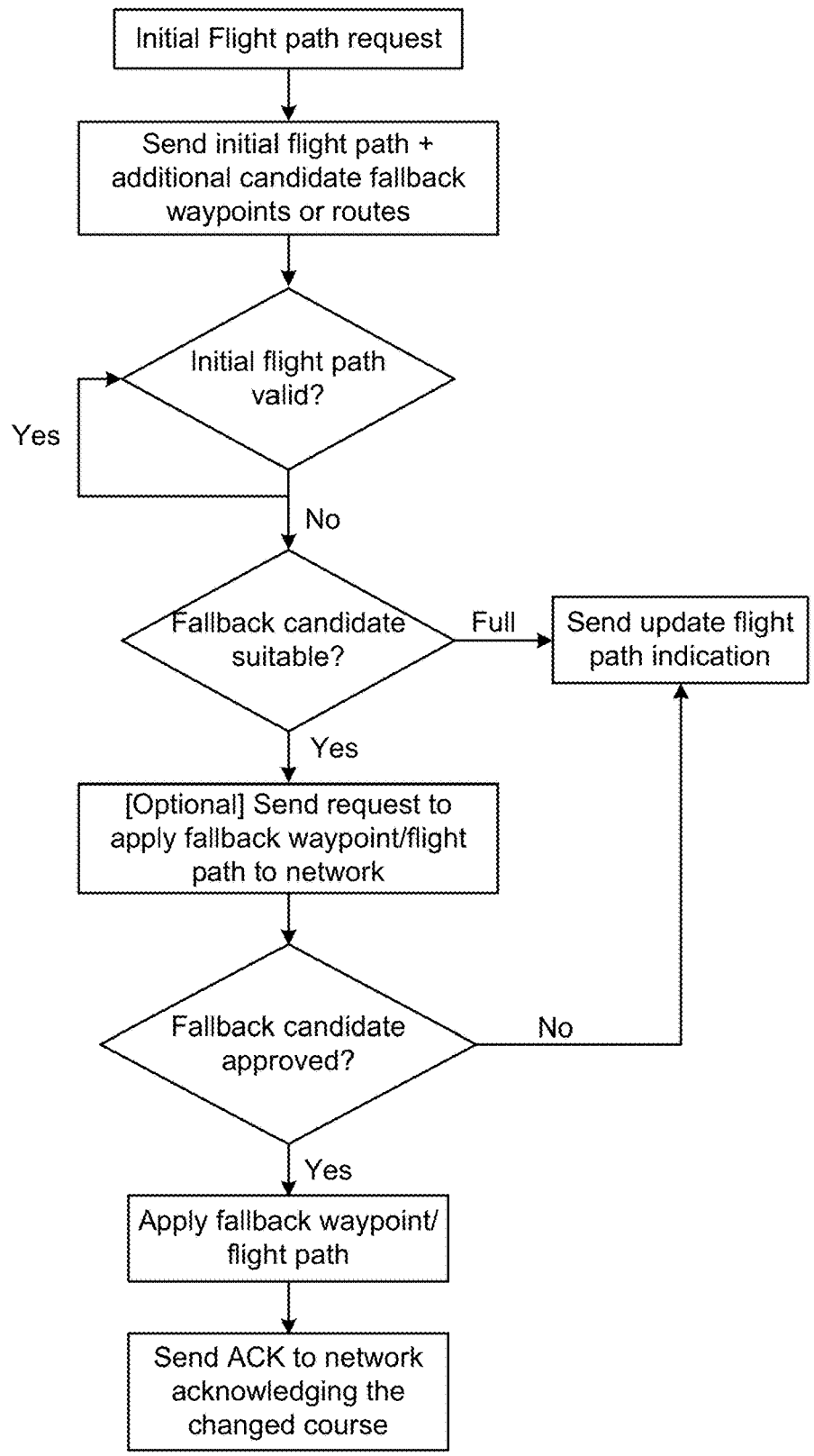
FIG. 8 illustrates an example of a pre-configured fallback.

FIG. 8 illustrates an example of a pre-configured fallback. A WTRU/UAV may be configured with at least one candidate flight path or waypoint. Without a loss of generality, one of the at least one candidate flight path may be the flight path that the WTRU/UAV currently follows. Such a flight path may be referred to as the current or initial flight path. The remaining flight path(s) of the at least one candidate flight path may be referred to as fallback flight path(s).

The WTRU may transmit an initial flight path and at least one fallback flight path in at least one of the following: in an RRC connection complete message; or in a UE information response message (e.g., WTRU information response message) (e.g., as part of a UE information request (e.g., WTRU information request) procedure). Flight paths (e.g., each flight path) may be identified by a flight path identity. The WTRU may determine a priority level for flight paths (e.g., each flight path) based on at least one of: a flight path for which a distance between an actual position of the WTRU and closest point on the flight path is minimized; a flight path that minimizes travel time or distance to a destination; or an explicit priority indication from the network.

In examples, the WTRU may receive an explicit priority indication for flight paths (e.g., each flight path) from the network (e.g., after transmission of initial flight path and fallback flight paths). In examples, the WTRU may receive an explicit priority indication in response to a request to modify the current flight path to a fallback flight path.

The WTRU may notify the network that a current flight path is changed to a fallback flight path. The WTRU may evaluate the validity of fallback flight path(s) (e.g., according to conditions described in examples herein). If at least one fallback flight path is valid, the WTRU may select one of the fallback flight paths and update the current flight path to this fallback flight path. If no fallback flight path is valid, the WTRU may autonomously determine an alternate (e.g., not previously indicated) or default flight path.

The WTRU may transmit an indication to the network of the change of the flight path to one of the fallback flight paths or a default flight path (e.g., using a flight path identity) or may provide a previous flight path that was not indicated (e.g., if no fallback flight path is valid). Such an indication may be included in an RRC message (e.g., a measurement report or a type of message (e.g., a new type of message) specific for this purpose). The WTRU may (e.g., may then) apply the change of flight path.

The WTRU may transmit a request to the network to change the flight path to one of the fallback flight paths. The WTRU may include the identity of the suggested fallback flight path in the request. The WTRU may (e.g., may then) receive a response from the network. If the response indicates confirmation of the fallback flight path, the WTRU may change the current flight path to the fallback flight path.

If the response indicates rejection of the suggested fallback flight path, the WTRU may apply a default flight path or an alternate (e.g., not previously signaled) flight path. The response may (e.g., may also) indicate a set of possible fallback flight path(s) with a priority indication. The WTRU (e.g., in such a case) may select one (e.g., the highest priority) of the fallback flight paths that are valid and may change the current flight path to this fallback flight path. The WTRU may (e.g., may then) transmit a notification to the network including the selected fallback flight path.

Examples of network indicated fallback waypoint(s) and/or flight path(s) are provided herein. A WTRU may request an updated flight path, waypoint, and/or set of waypoints from the network. The WTRU may perform one or more of the following.

A WTRU may transmit a first message (e.g., an RRC connection complete message) indicating a flight path information is available. The WTRU may receive a second message (e.g., a UE information request message (e.g., a WTRU information request message)) including a flight path reporting configuration requesting flight path information. The WTRU may transmit an initial flight path report (e.g., within a third message). The WTRU may detect that the initial flight path is invalid and notify a network. The WTRU may indicate the set of waypoints which are no longer valid and may (e.g., may need) an alternative. The WTRU may monitor for a network indication of an updated fallback waypoint and/or flight path to apply. In examples, the WTRU may monitor for a fixed duration for the network duration.

If the WTRU receives fallback waypoint(s) and/or flight path(s), the WTRU may update a currently maintained flight path (e.g., initial flight path). The WTRU may transmit an ACK to the network that an updated flight path has been applied. If the WTRU does not receive a fallback waypoint or a flight path (e.g., in time), the WTRU may perform an autonomous flight path correction and may transmit a flight path update indication to the network.

Figure 9:
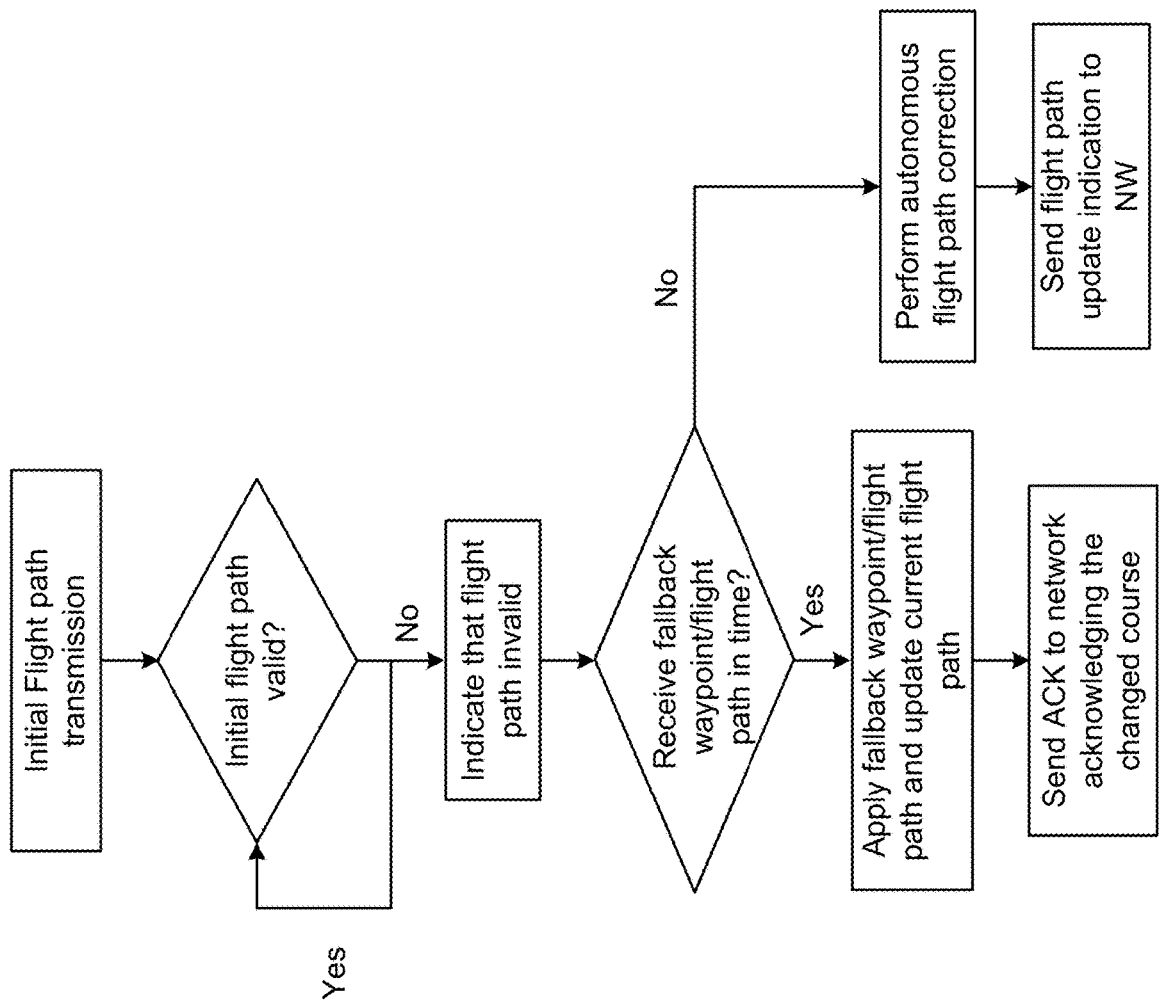
FIG. 9 illustrates an example request of an alternate flight path.

FIG. 9 illustrates an example request of an alternate flight path. A WTRU may let the network decide a fallback route or waypoint location. This may be useful, for example, to allow the network to direct the WTRU to areas which are less congested by other WTRUs or to aid load balancing on the network side (e.g., by physically directing the WTRU to a different location).

If detecting that the current flight path is no longer valid (e.g., based on satisfaction of one or more conditions listed within examples herein), the WTRU may notify the network. This notification may include (e.g., additionally include) a request for an updated waypoint and or flight path information from the network. The WTRU may (e.g., while waiting for a network response) remain stationary in the air.

The WTRU may monitor for a network response for a given time period (e.g., which may begin if receiving the indication/request). If the WTRU receives an indication within the time period including the alternative fallback flight path information and/or waypoint(s), the WTRU may adjust the flight path of the WTRU accordingly. If the flight path adjustment is executed, the WTRU may transmit an ACK to the network to notify that the flight path has been successfully updated. If the flight path update is executed, the WTRU may transmit an updated flight path report. A WTRU may receive an updated flight path and/or waypoint(s) via one or more of the following: RRC signaling, a MAC CE, or a DCI.

If the WTRU does not receive an alternate flight path and/or waypoint, receives a negative acknowledgement (NACK) or rejection of the request, or if the WTRU does not receive an alternate flight path and/or waypoint within the indicated time period, the WTRU may perform an autonomous flight path correction. If (e.g., when) the autonomous flight path correction has been applied, the WTRU may notify the network (e.g., via a flight path update notification) or may directly transmit the updated flight path report.

Examples of prohibit conditions for triggering a flight path indication are provided herein. A prohibit timer may be configured to control the WTRU from sending two consecutive flight path update reports or indications within a given time (e.g., the WTRU may refrain from sending a second flight path update report or indication after sending a first flight path update or report, for the configured prohibit timer duration). This timer may be started when a flight path report is transmitted and/or flight path update is indicated. The prohibit timer may be overridden, for example, based on a network request or subject to some conditions (e.g., more than X number of waypoint(s) have become invalid).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), the WTRU comprising:
   a processor configured to:
      receive configuration information, wherein the configuration information:
         indicates a configuration associated with enabling transmission of a flight path update indication, and
         indicates a threshold associated with triggering the transmission of the flight path update indication, wherein the threshold is received via a radio resource control (RRC) message;
      determine that at least one of a first timestamp associated with a first waypoint or a second timestamp associated with a second waypoint is to be removed from flight path information; and based on at least one of the first timestamp associated with the first waypoint or the second timestamp associated with the second waypoint being removed from the flight path information, transmit the flight path update indication via a user equipment (UE) assistance information message.

2. The WTRU of claim 1, wherein the processor is further configured to:
transmit a first message indicating the flight path information is available;
receive a second message including a flight path reporting configuration, wherein the flight path reporting configuration requests the flight path information;
transmit an initial flight path report in a third message; and
at a configured periodicity, evaluate whether the flight path information has changed since a previous flight path report was transmitted, wherein the flight path update indication is transmitted further based on an evaluation that the flight path information has changed since the previous flight path report was transmitted.

3. The WTRU of claim 2, wherein the processor is further configured to:
receive a request to transmit updated flight path information.

4. The WTRU of claim 3, wherein the processor is further configured to:
transmit the updated flight path information.

5. The WTRU of claim 2, wherein the processor is further configured to:
based on an evaluation that the flight path information has not changed, transmit an acknowledgment that there has been no change since the previous flight path report.

6. The WTRU of claim 2, wherein the flight path reporting configuration includes at least one of: a number of waypoints; whether to include timestamp information; or a configuration to periodically report flight path information updates.

7. The WTRU of claim 1, wherein the threshold is a distance-based threshold or a time-based threshold.

8. The WTRU of claim 1, wherein:
the threshold is a distance-based threshold,
the processor is further configured to determine that the distance-based threshold associated with triggering the transmission of the flight path update indication is satisfied based on a distance between an updated location of at least one of the first waypoint or the second waypoint and a previously provided location of at least one of the first waypoint or the second waypoint exceeding the distance-based threshold, and
the flight path update indication via the UE assistance information message is transmitted further based on the distance-based threshold being satisfied.

9. A method associated with a wireless transmit/receive unit (WTRU), the method comprising:
receiving configuration information, wherein the configuration information:
indicates a configuration associated with enabling transmission of a flight path update indication, and
indicates a threshold associated with triggering the transmission of the flight path update indication, wherein the threshold is received via a radio resource control (RRC) message;
determining that at least one of a first timestamp associated with a first waypoint or a second timestamp associated with a second waypoint is to be removed from flight path information; and
based on at least one of the first timestamp associated with the first waypoint or the second timestamp associated with the second waypoint being removed from the flight path information, transmitting the flight path update indication via a user equipment (UE) assistance information message.

10. The method of claim 9, further comprising:
transmitting a first message indicating the flight path information is available;
receiving a second message including a flight path reporting configuration, wherein the flight path reporting configuration requests the flight path information;
transmitting an initial flight path report in a third message; and
at a configured periodicity, evaluating whether the flight path information has changed since a previous flight path report was transmitted, wherein the flight path update indication is transmitted further based on an evaluation that the flight path information has changed since the previous flight path report was transmitted.

11. The method of claim 10, further comprising:
receiving a request to transmit updated flight path information.

12. The method of claim 11, further comprising:
transmitting the updated flight path information.

13. The method of claim 10, further comprising:
based on an evaluation that the flight path information has not changed, transmitting an acknowledgment that there has been no change since the previous flight path report.

14. The method of claim 10, wherein the flight path reporting configuration includes at least one of: a number of waypoints; whether to include timestamp information; or a configuration to periodically report flight path information updates.

15. The method of claim 9, wherein the threshold is a distance-based threshold or a time-based threshold.

16. The method of claim 9, wherein the threshold is a time-based threshold, further comprising:
determining that the time-based threshold associated with triggering the transmission of the flight path update indication is satisfied based on a time difference between a first expected time of arrival at a waypoint location reported and a second expected time of arrival at the waypoint location exceeding the time-based threshold, wherein the flight path update indication via the UE assistance information message is transmitted further based on the time-based threshold being satisfied.

17. A wireless transmit/receive unit (WTRU), the WTRU comprising:
a processor configured to:
transmit a first message indicating flight path information is available;
receive a second message including a flight path reporting configuration, wherein the flight path reporting configuration requests the flight path information;
transmit an initial flight path report in a third message;
receive configuration information, wherein the configuration information:
indicates a configuration associated with enabling transmission of a flight path update indication, and
indicates a threshold associated with triggering the transmission of the flight path update indication, wherein the threshold is received via a radio resource control (RRC) message;

at a configured periodicity, evaluate whether the flight path information has changed since a previous flight path report was transmitted;

determine that at least one of a first timestamp associated with a first waypoint or a second timestamp associated with a second waypoint is to be removed from the flight path information;

based on at least one of the first timestamp associated with the first waypoint or the second timestamp associated with the second waypoint being removed from the flight path information and an evaluation that the flight path information has changed since the previous flight path report was transmitted, transmit the flight path update indication via a user equipment (UE) assistance information message;

receive a request to transmit updated flight path information; and transmit the updated flight path information.

* * * * *